United States Patent
Chawro et al.

(10) Patent No.: US 7,533,416 B2
(45) Date of Patent: May 12, 2009

(54) FRAMEWORK FOR PROTECTION LEVEL MONITORING, REPORTING, AND NOTIFICATION

(75) Inventors: Salim Chawro, Sammamish, WA (US); Mark D. Zuber, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 11/040,545

(22) Filed: Jan. 20, 2005

(65) Prior Publication Data

US 2005/0246776 A1    Nov. 3, 2005

Related U.S. Application Data

(63) Continuation-in-part of application No. 10/836,391, filed on Apr. 29, 2004.

(51) Int. Cl.
G06F 17/30 (2006.01)
(52) U.S. Cl. ...................................................... 726/25
(58) Field of Classification Search ................... 726/25
See application file for complete search history.

(56) References Cited

U.S. PATENT DOCUMENTS

| | | | | |
|---|---|---|---|---|
| 5,758,154 A * | 5/1998 | Qureshi | ........................... | 713/1 |
| 5,903,753 A * | 5/1999 | Bramnick et al. | ........... | 719/328 |
| 6,128,016 A | 10/2000 | Coelho | | |
| 6,182,134 B1 | 1/2001 | Collins | | |
| 6,269,456 B1 * | 7/2001 | Hodges et al. | ................ | 714/38 |
| 6,301,710 B1 * | 10/2001 | Fujiwara | ..................... | 717/175 |
| 6,374,401 B1 * | 4/2002 | Curtis | ......................... | 717/175 |
| 6,493,755 B1 * | 12/2002 | Hansen et al. | .............. | 709/224 |
| 6,553,416 B1 | 4/2003 | Chari | | |
| 6,567,808 B1 * | 5/2003 | Eschelbeck et al. | ........... | 707/10 |
| 7,028,228 B1 | 4/2006 | Lovy | | |
| 7,146,568 B2 | 12/2006 | Richardson | | |
| 7,249,187 B2 * | 7/2007 | Sobel et al. | ................. | 709/229 |
| 7,305,709 B1 * | 12/2007 | Lymer et al. | .................. | 726/25 |
| 2002/0089528 A1 | 7/2002 | Hay | | |
| 2002/0095592 A1 * | 7/2002 | Daniell et al. | ............... | 713/200 |
| 2002/0133584 A1 | 9/2002 | Greuel | | |

(Continued)

OTHER PUBLICATIONS

UKY (University of Kentucky, Nov. 4, 2003 and Feb. 24, 2004, http://www.uky.edu/IT/CustomerService/docs/mcafee_win2kxp/index.html and http://www.uky.edu/IT/CustomerService/kb/security/secure_computing.html), see attached UK1 date, UKY1, UKY2 and UKY3.*

(Continued)

Primary Examiner—Kambiz Zand
Assistant Examiner—Peter Poltorak
(74) Attorney, Agent, or Firm—Workman Nydegger

(57) ABSTRACT

A framework and associated methods for monitoring, reporting, and notifying with respect to security protection levels on a computer. For each security threat, a baseline level of protection is defined. A schema is configured to define fields usable by a security provider to indicate a level of protection provided by the security provider. Using the schema, the fields may be stored in a repository. Each time a security provider changes states with respect to level of protection, the appropriate field or fields in the repository are updated. Consumer applications may read from the repository at any time to obtain information that indicates the level of protection. Applications may be informed when data within the repository changes.

17 Claims, 19 Drawing Sheets

U.S. PATENT DOCUMENTS

| | | | |
|---|---|---|---|
| 2003/0065942 A1* | 4/2003 | Lineman et al. | 713/201 |
| 2004/0002982 A1* | 1/2004 | Ersek et al. | 707/100 |
| 2004/0019803 A1 | 1/2004 | Jahn | |
| 2005/0125687 A1* | 6/2005 | Townsend et al. | 713/200 |
| 2005/0155031 A1* | 7/2005 | Wang et al. | 717/170 |

OTHER PUBLICATIONS

Lavy (Matthew M. Lavy and Ashley J. Meggitt, Windows Management Instrumentation (WMI), ISBN 978-1-57870-260-2, Oct. 9, 2001), see attached Lavy1 and Lavy2.*

McGuire (Thomas McGuire, Guide to MS' Baseline Security Analyzer (MBSA), Apr. 23, 2002.*

Hipson (Peter D. Hipson, "Expert Guide to Windows NT 4 Registry", ISBN: 0-7821-1983-2, 1999).*

Office Action mailed Jun. 27, 2007 cited in related U.S. Appl. No. 10/836,391.

Worthington, David. BetaNews. "Security Center Planned for Windows XP SP2". Feb. 25, 2004.

Symantec. Norton AntiVirus 2003 User's Guide. pp. 1-101. 2002.

Inquirer. Norton Internet Security 2003 Software. Stop 'em on sight. Sunday, Jun. 1, 2003.

Office Action dated Dec. 13, 2007 cited in U.S. Appl. No. 10/836,391.

Office Action dated Jun. 30, 2008 cited in U.S. Appl. No. 10/836,391.

Grevstad, Eric. Norton Internet Security 2003, The Safe Buy Gets Safer. Hardware Central Oct. 28, 2002.

* cited by examiner

| Field | Type | Conditions |
|---|---|---|
| ID | Guid | Not Null |
| Product Name | String | Not Null |
| Enabled | Bool | Not Null |
| Up-to-date | Bool | Not Null |
| Path to executable | String | Optional |
| Parameters to enable | String | Optional |
| Parameters to launch UI | String | Optional |
| Parameters to update | String | Optional |

Anti-virus Product

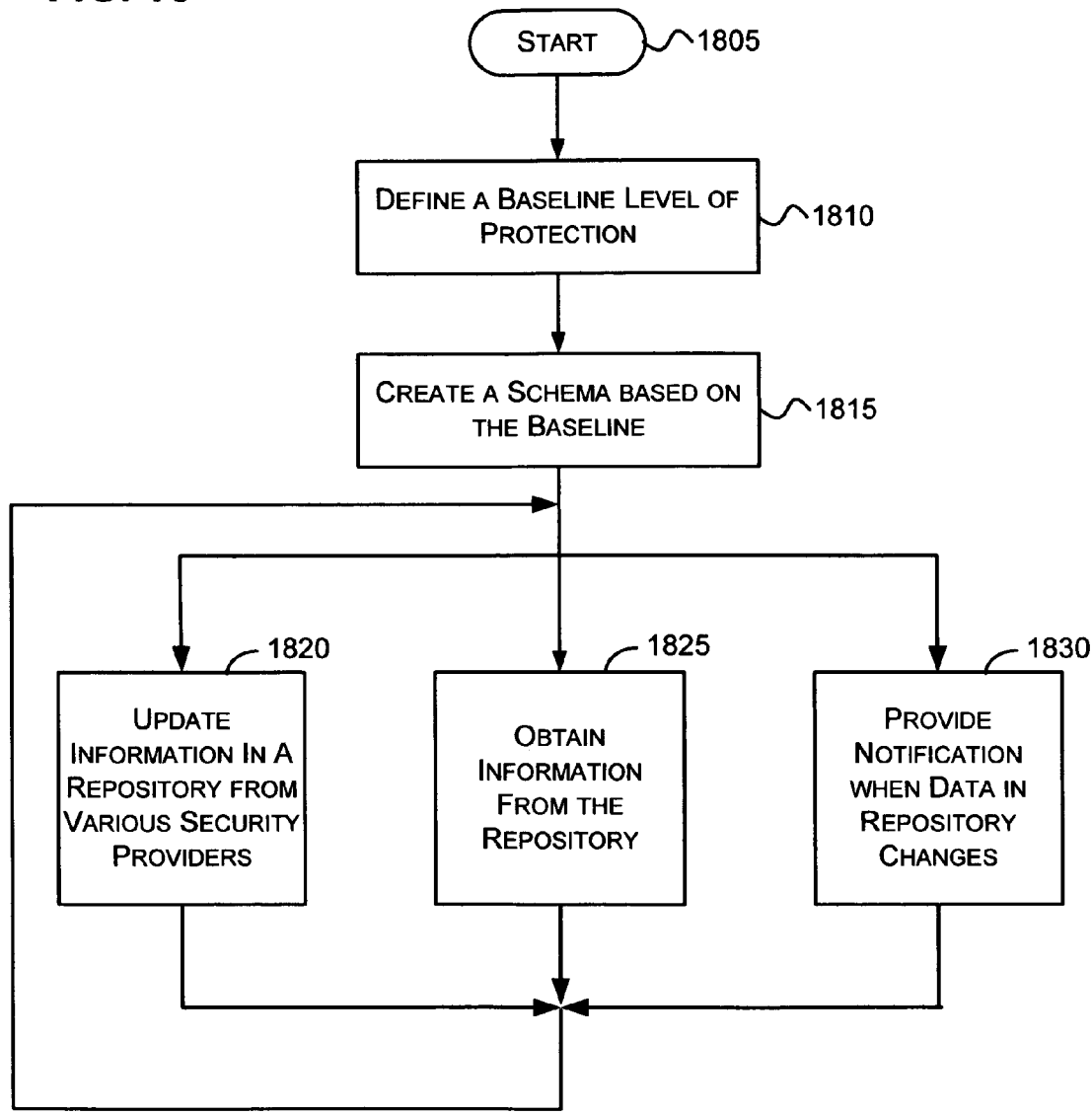

FIG. 19

```
#pragma namespace("\\\\.\\root")

instance of __namespace
{
   Name="SecurityCenter";
};

#pragma namespace("\\\\.\\root\\SecurityCenter")

class AntiVirusProduct
{
    [key, Not_Null] string instanceGuid;
    [Not_Null]      string displayName;
    [Not_Null]      boolean productUptoDate;
    [Not_Null]      boolean onAccessScanningEnabled;
                    string pathToUpdateUI;
                    string updateUIParameters;
                    uint8 updateUIMd5Hash[];
                    string pathToEnableOnAccessUI;
                    string enableOnAccessUIParameters;
                    uint8 enableOnAccessUIMd5Hash[];
                    string companyName;
                    string versionNumber;
};

class FirewallProduct
{
    [key, Not_Null] string instanceGuid;
    [Not_Null]      string displayName;
    [Not_Null]      boolean enabled;
                    string pathToEnableUI;
                    string enableUIParameters;
                    uint8 enableUIMd5Hash[];
                    string companyName;
                    string versionNumber;
};
```

FRAMEWORK FOR PROTECTION LEVEL MONITORING, REPORTING, AND NOTIFICATION

CROSS-REFERENCE TO RELATED APPLICATION

This application is a continuation-in-part of U.S. patent application Ser. No. 10/836,391, filed Apr. 29, 2004, now pending, which application is incorporated herein by reference in its entirety.

FIELD OF THE INVENTION

The invention relates generally to computers, and more particularly to security.

BACKGROUND

Computer security threats are becoming an almost everyday occurrence. In conjunction with computer security, computer users are bombarded with terms like antivirus software, firewalls, updates, signatures, and the like. In the past, security was handled by experts who could readily determine whether a computer system was current with respect to antivirus updates, firewalls, operating system updates, and the like. At the corporate level, many companies have dealt with security issues by placing computers behind corporate firewalls and obtaining antivirus software that scans incoming e-mail, thus shielding the end user from some of the complexities of maintaining security.

Small business and home computer users, however, often do not have access to the information technology professionals found at large companies. Whether the computers for such groups of users are adequately protected, depends largely upon the expertise and knowledge of each individual user. Because of information technology budgets and resources and the creativity of computer virus creators, even corporate computer users who rely on information technology professionals may not be adequately protected, particularly as new threats arise. Unfortunately, computer users in both small and large organizations often have insufficient knowledge as to how protected they are or how they should respond to new threats.

What is needed is a framework for monitoring, reporting, and notifying with respect to protection levels on a computer. Ideally, the framework would allow security providers to indicate the security statuses of their associated solutions and would allow consumer applications to readily access this information.

SUMMARY

Briefly, the present invention provides a framework and associated methods for monitoring, reporting, and notifying with respect to security protection levels on a computer. For each security threat, a baseline level of protection is defined. A schema is configured to define fields usable by a security provider to indicate a level of protection provided by the security provider. Using the schema, the fields may be stored in a repository. Each time a security provider changes states with respect to level of protection, the appropriate field or fields in the repository are updated. Consumer applications may read from the repository at any time to obtain information that indicates the level of protection. Applications may be informed when data within the repository changes.

Other advantages will become apparent from the following detailed description when taken in conjunction with the drawings, in which:

BRIEF DESCRIPTION OF THE DRAWINGS

FIG. 16 is a table representing an exemplary data structure that may be used to practice the invention in accordance with various aspects of the invention;

FIG. 18 is a dataflow diagram that generally represents exemplary actions that may occur in relation to a repository in accordance with various aspects of the invention; and FIG. 19 includes an exemplary schema that defines fields for antivirus and firewall products according to various aspects of the invention

DETAILED DESCRIPTION

Exemplary Operating Environment

Figure 1:
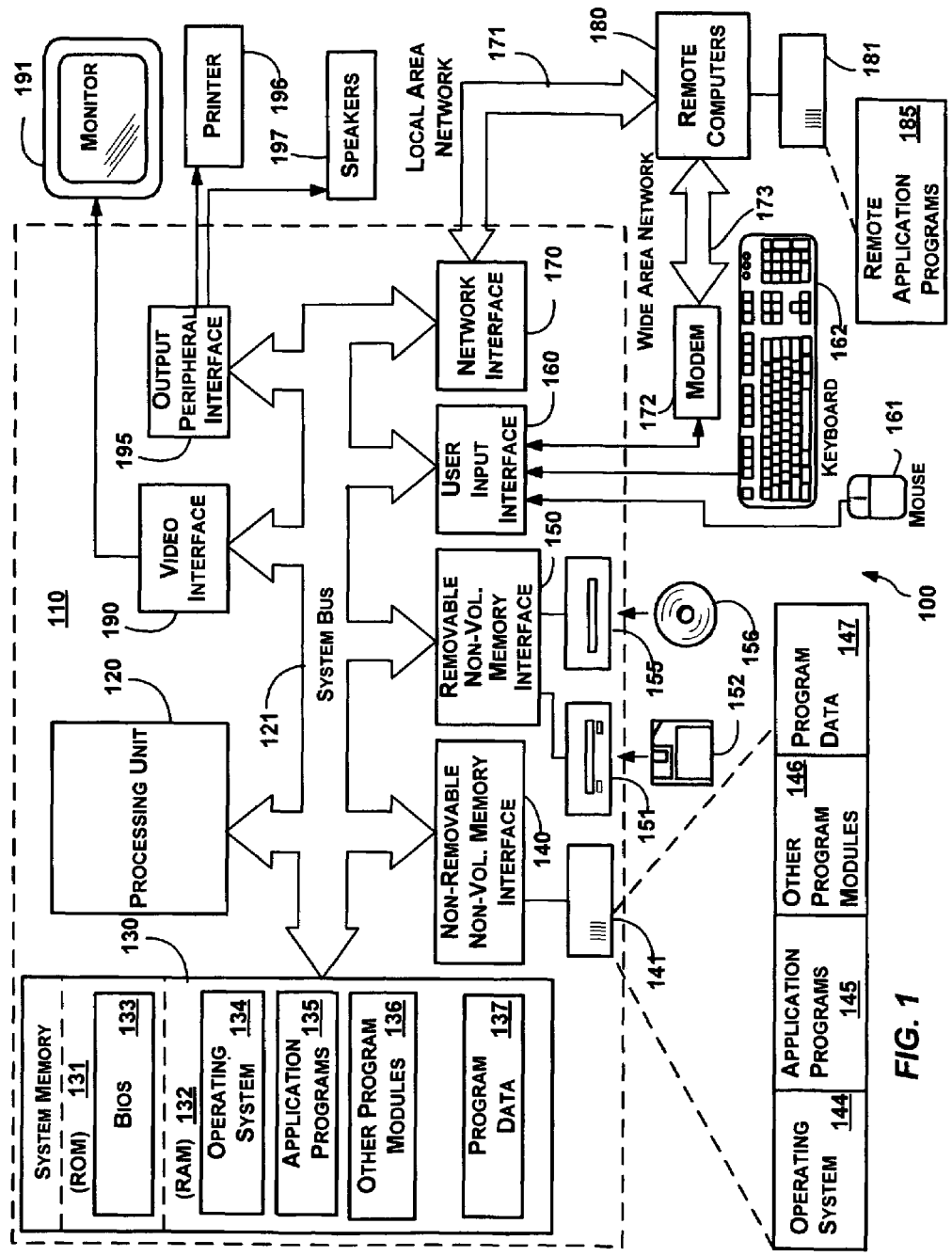
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Security Center

Figure 2:
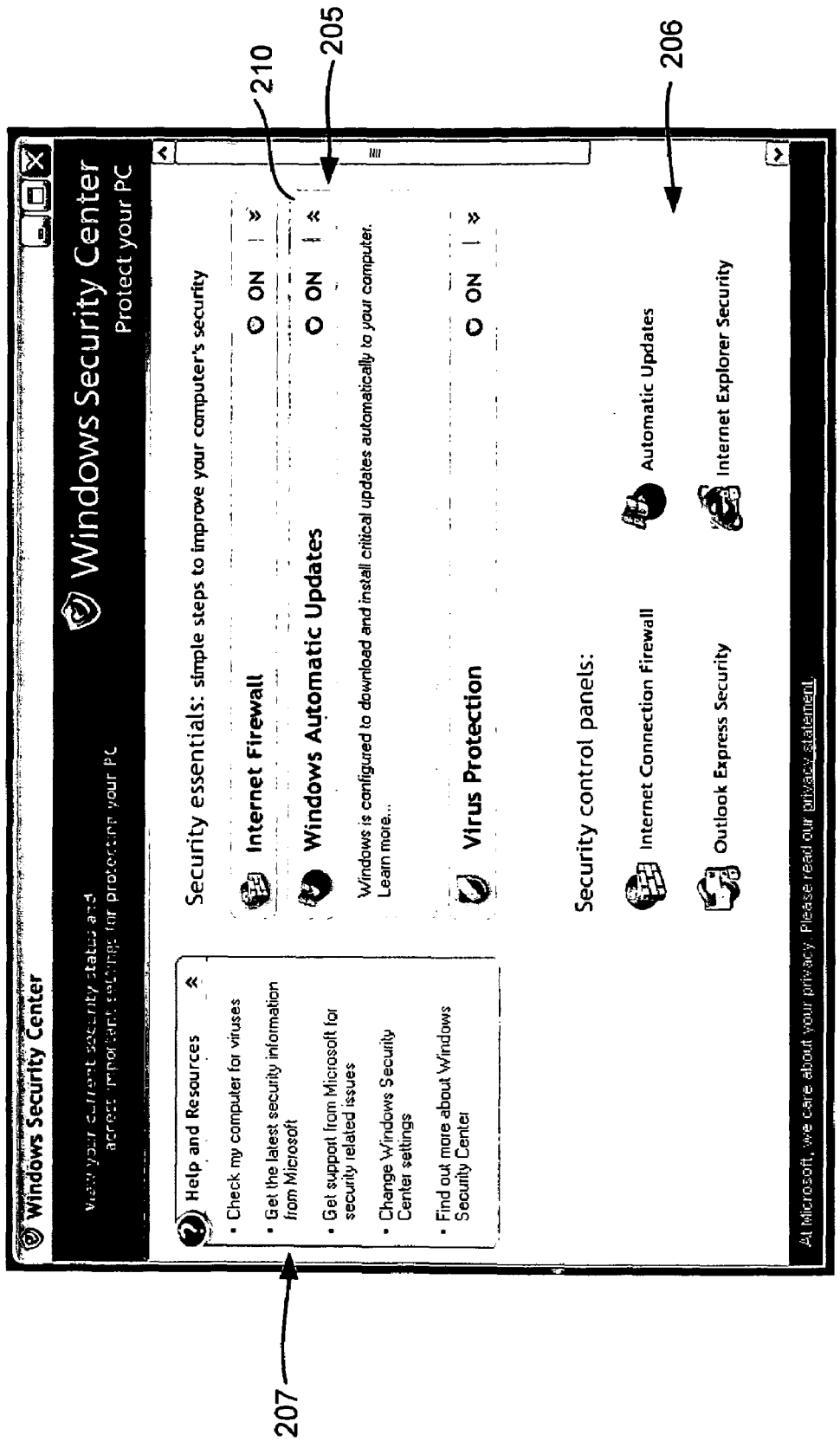
FIG. 2 shows a window including an exemplary user interface that operates in accordance with various aspects of the invention.

FIG. 2 shows a window including an exemplary user interface that operates in accordance with various aspects of the invention. In the user interface, there are three main areas 205-207 shown. Each area is related to security as described below.

The area 205 includes prescription items that relate to security protection components and/or solutions that need to be installed, up-to-date, and functioning properly to provide basic security protection. Each prescription item may be expanded to reveal additional information. For example, the item 210 has been expanded to provide more information about automatic updates. In addition, each of the items includes a status icon that readily indicates the status of the item.

Each status icon may be shown in color to make it easier to identify the status of the associated item. For example, a color of green may indicate that at least one of the security solutions associated with the item is OK (e.g., enabled, updated, and operating correctly). A color of yellow may indicate that the security center is unaware as to the status of security solutions related to the item. For example, a user may indicate that the user has installed a solution that the security center may not be able to detect (e.g., an unlisted third party antivirus solution). As the security center does not know whether the third party antivirus application is correctly installed, updated, or executing, the security center may color the status icon yellow. A color of red may indicate that the applications associated with the item are not installed, updated, or functioning properly.

A color of an icon may indicate a degree of preference of the configuration associated with the item. For example, with respect to updates, an ideal update configuration is to automatically download and install an update as soon as notification is received that the update is available. A less preferred update configuration is to involve the user before downloading and/or installing updates. An unacceptable update configuration is to not check for or download updates at all.

It will be recognized that more than three colors may be used to identify the status of each item without departing from the spirit or scope of the invention. It will also be recognized that more than three prescription items may be included in the area 205 without departing from the spirit or scope of the invention.

Text may be placed next to each status icon to briefly indicate the status. For example, text such as "ON," "FAIR," "OFF," "NOT CONFIGURED," and "NOT FOUND" may be placed next to each icon to briefly describe the nature of the status.

Having color and/or text are some examples of easily understood status indicators. Other embodiments of the invention may include other easily understood status indicators including animation, computer-generated sound or speech, tactile or other feedback, and the like. It will be understood that any easily understood status indicator may be used in combination with or without text and color to indicate status without departing from the spirit or scope of the invention.

When one or more of the prescription items has a red status, an "engine light" may be turned on. The engine light is similar to an engine warning light of a car in that it turns on when something is wrong with the engine and turns off when nothing wrong is detected. The engine light indicates to the user that the security of the computer needs attention. When each of the prescription items has a status of yellow or green, the engine light may not be on.

The engine light may be turned on when at least one of the prescription items has a red status and the user has not elected to ignore red status for the associated prescription items.

The area 206 includes icons that link to applets associated with security. Any application may be categorized in a security category. Typically, the application registers itself in a category when the application is installed, but the application, another application, or a user may do so at a later time. Some exemplary security categories are shown in the area 206. Selecting one of the icons in the area 206 may cause an applet to execute that displays information about applications or components associated with the security category represented by the icon.

The area 207 includes exemplary links to additional help and resources. For example, the links may link to Web pages that include more information about basic security topics, including, for example, firewalls, automatic updates, and antivirus protection. The Web pages may include information about current viruses, current security tactics, and the like. A link may link to a location at which updates may be obtained. In addition, the links may link to Web pages from which support (live or otherwise) may be obtained regarding security. A link may link to security help files that are found on the computer including help files related to the security center. A link may link to a user interface that allows the user to configure the alerts provided by the security center. It will be understood that fewer, more, or other types of links may be provided in the area 207 without departing from the spirit or scope of the present invention.

Figure 3:
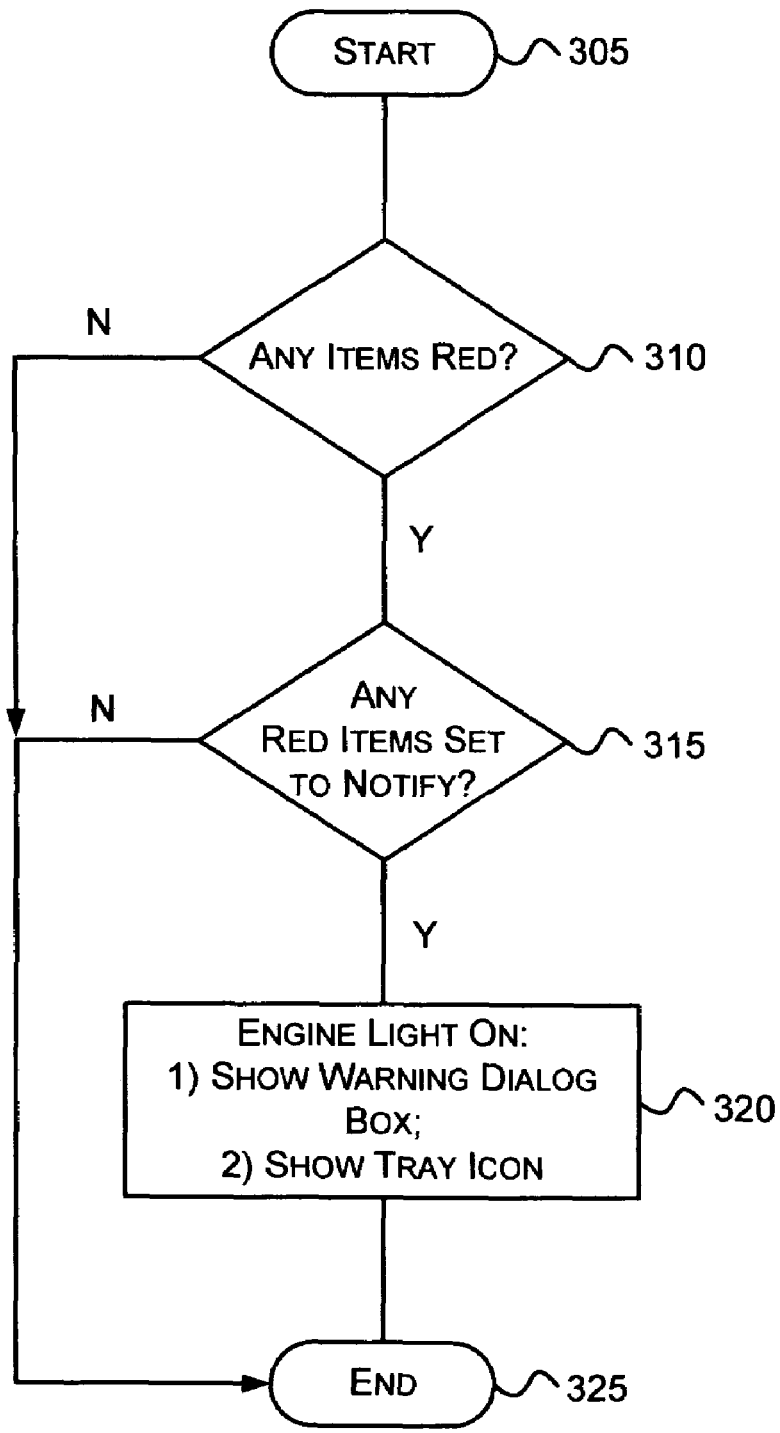
FIG. 3 is a dataflow diagram that generally represents exemplary steps that may occur when determining whether the engine light is shown.

FIG. 3 is a dataflow diagram that generally represents exemplary steps that may occur when determining whether the engine light is shown. In essence, if any item has a status of red and is set to notify, the engine light will be manifested through a balloon, tray icon, or the like.

Figure 4A:
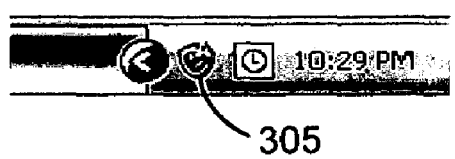
FIG. 4A shows an exemplary depiction of a tray icon that may be shown to indicate an engine light in accordance with various aspects of the invention.

The engine light may be manifested in at least two ways, including a tray icon and an alert balloon. FIG. 4A shows an exemplary depiction of a tray icon that may be shown to indicate an engine light in accordance with various aspects of the invention. The icon 305, when shown in the system tray, indicates that the engine light is on. The icon 305 may be colored red (or some other color) to emphasize that the security of the computer needs attention. In addition, the icon may be shaped like a shield (or some other shape) that readily associates the icon with the security of the computer.

Figure 4B:
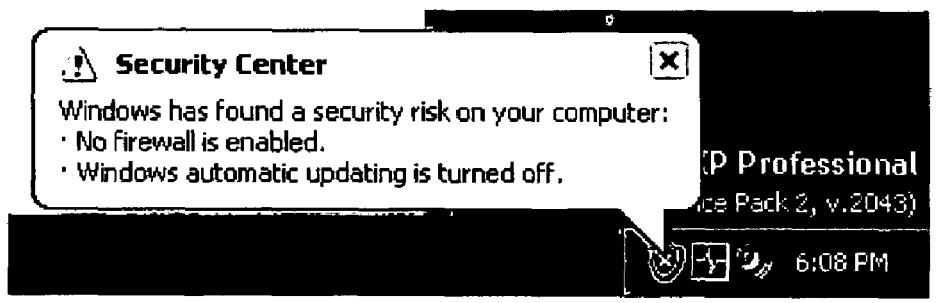
FIG. 4B shows an exemplary depiction of an alert balloon in accordance with various aspects of the invention.

FIG. 4B shows an exemplary depiction of an alert balloon in accordance with various aspects of the invention. The alert balloon may indicate the security risks of the computer. These security risks may relate to the prescriptions items previously mentioned. For example, the alert balloon shown in FIG. 4B indicates that no firewall is functioning properly and that automatic updating is turned off. An alert balloon may appear at logon or when any of the statuses for which notification is enabled becomes red. The alert balloon may remain until dismissed or until the security center is opened. Selecting the alert balloon may open the security center.

It will be recognized that the engine light may be manifested in other ways without departing from the spirit or scope of the invention.

Figure 5:
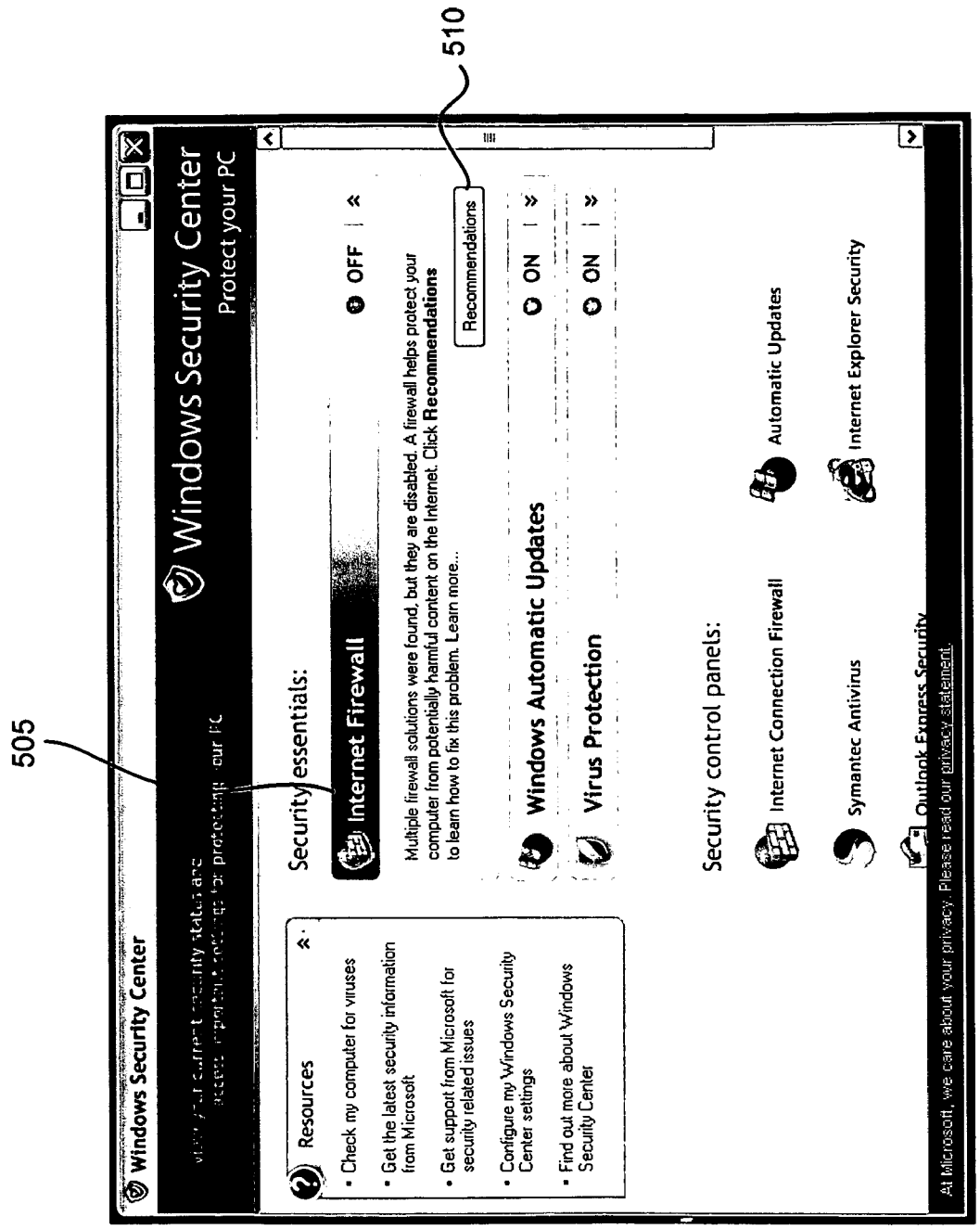
FIG. 5 shows a window including an exemplary user interface that operates in accordance with various aspects of the invention.

FIG. 5 shows a window including an exemplary user interface that operates in accordance with various aspects of the invention. In the user interface, the Internet Firewall item 505 has a red status. Whenever an item has a red or yellow status, a recommendations button 510 may be displayed. When activated, the recommendations button 510 may open another window or the like that provides recommendations as to what steps the user may take to increase the security of the computer.

This other window may provide links for following the recommendations. For example, the security center may indicate that a firewall solution does not exist on the computer and provide a link that refers the user to a firewall solution provider so that the user may purchase and install a firewall solution. As another example, the other window may provide a link that launches and enables an already-installed firewall solution. As yet another example, the other window may provide a check box that indicates that the user has another firewall that is not detected by the security center. The user may further indicate that the user will be responsible for verifying that the other firewall is installed properly, up-to-date, and executing and that the security center should not turn on the engine light if it does not detect the other firewall. In general, the other window provides easy-to-follow steps for providing the basic security recommended thereon.

In some embodiments of the invention, a recommendations button 510 may be provided even when an item has a green status. When activated, the recommendations button 510 may open another window or the like that provides links to additional resources on security, information related to enhanced security, and the like.

In determining whether the computer has basic security in place, the security center may attempt to detect all known firewall solutions on the computer, including firewalls associated with an operating system (OS) as well as third party firewalls. The following table describes different statuses, engine light states, and recommendations that may result depending on the outcome of the detection.

| OSF | 3rd Party FW | Engine Light | Status | Recommendation |
|---|---|---|---|---|
| On | Enabled | Off | Green | None |
| Off | Enabled | Off | Green | None |
| On | Did not detect | Off | Green | None |
| Off | Did not detect | On | Red | Enable OS Firewall; or Check box indicating presence of firewall solution not detected |
| On | Disabled | Off | Green | None |
| Off | Disabled | On | Red | Enable third party firewall solution; Enable OS Firewall Check box indicating presence of firewall solution not detected |
| On | Presence only | Off | Green | None |
| OFF | Presence only | On | Red | Enable OS Firewall; or Check box indicating presence of firewall solution not detected |

Figure 6A:
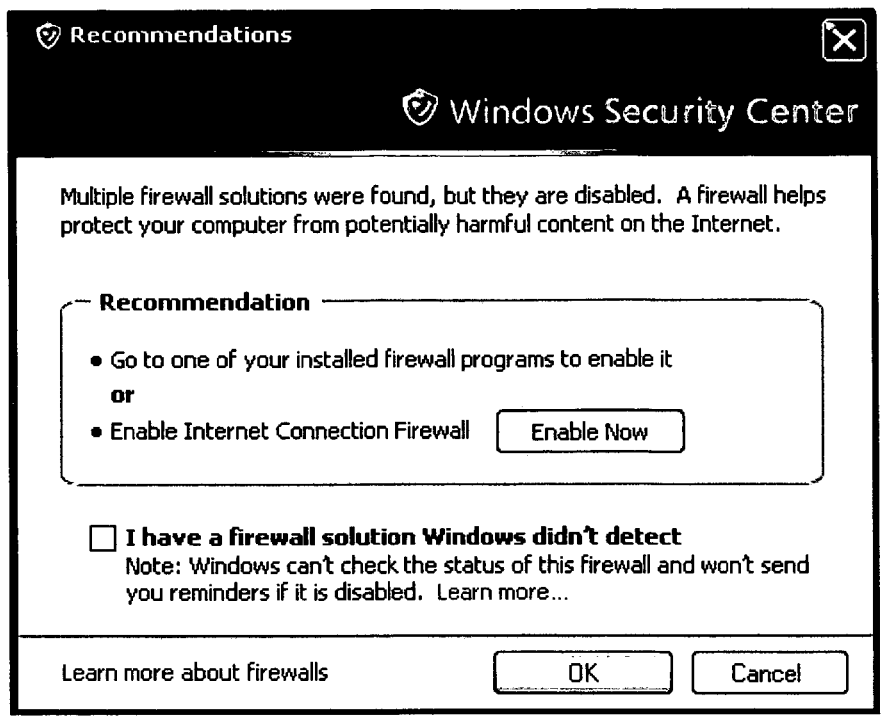
FIG. 6A shows a window including an exemplary user interface screen that operates in accordance with various aspects of the invention.

In essence, if a firewall solution is enabled and working properly, the status is green. If a firewall solution is not detected, enabled, or working properly, the status is red. Selecting the recommendations button 510 may cause a window to be displayed as shown in FIG. 6A. This window shows what the user may do to improve security or disable notification for non-detected firewalls.

In some cases, the security center may detect that a solution has been installed correctly but may not detect whether the solution is up-to-date or operating correctly. Detecting whether a solution is installed correctly is discussed in more detail below. Some security solutions may not have adequate externally-observable phenomena to determine whether they are operating correctly. In such situations, the best that the security center may be able to do is to detect the presence of the security solution. Being able to detect the presence only of a security solution is sometimes referred to as detecting the "presence only" of the solution.

Figure 7:
FIG. 7 shows a window including an exemplary dialog box that may be shown to inform a user of consequences of checking a box in accordance with various aspects of the invention.

FIG. 6A shows a window including an exemplary user interface screen that operates in accordance with various aspects of the invention. The screen shows recommendations and provides a button for enabling a firewall associated with an OS. The screen may also include a check box that the user may select to indicate that the user has a firewall solution that is not detected. A dialog box similar to that shown in FIG. 7 may be shown to inform the user of the consequences of checking the box. Checking this check box may cause the security center to stop checking for a firewall solution and to indicate a yellow status for the Internet Firewall item 505. In this case, having a yellow status means that the user is responsible for ensuring that the firewall solution is operating correctly and is up-to-date.

Figure 6B:
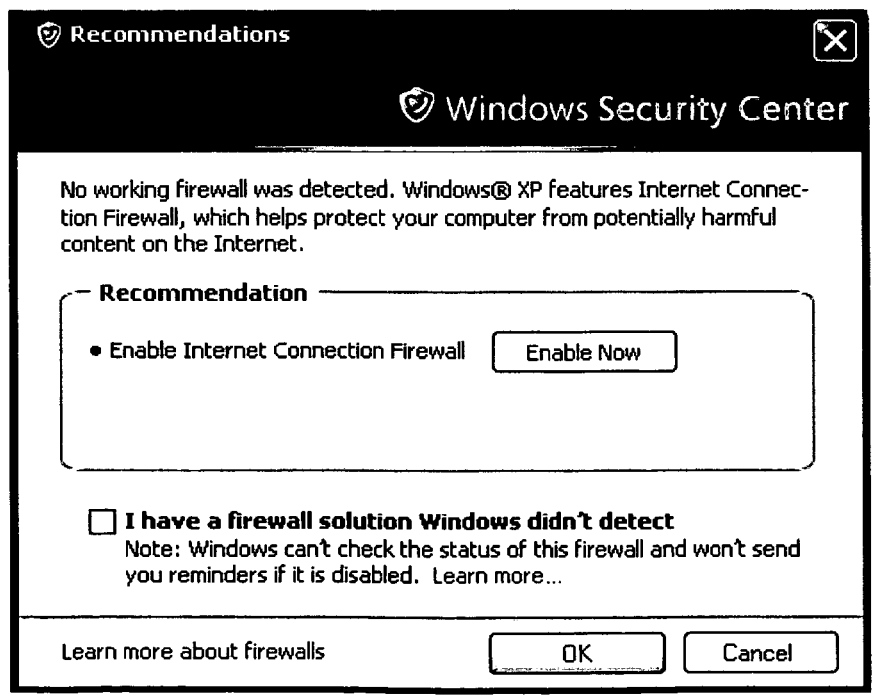
FIGS. 6B and 6C show other exemplary user interface screens that operate in accordance with various aspects of the invention.
Figure 6C:
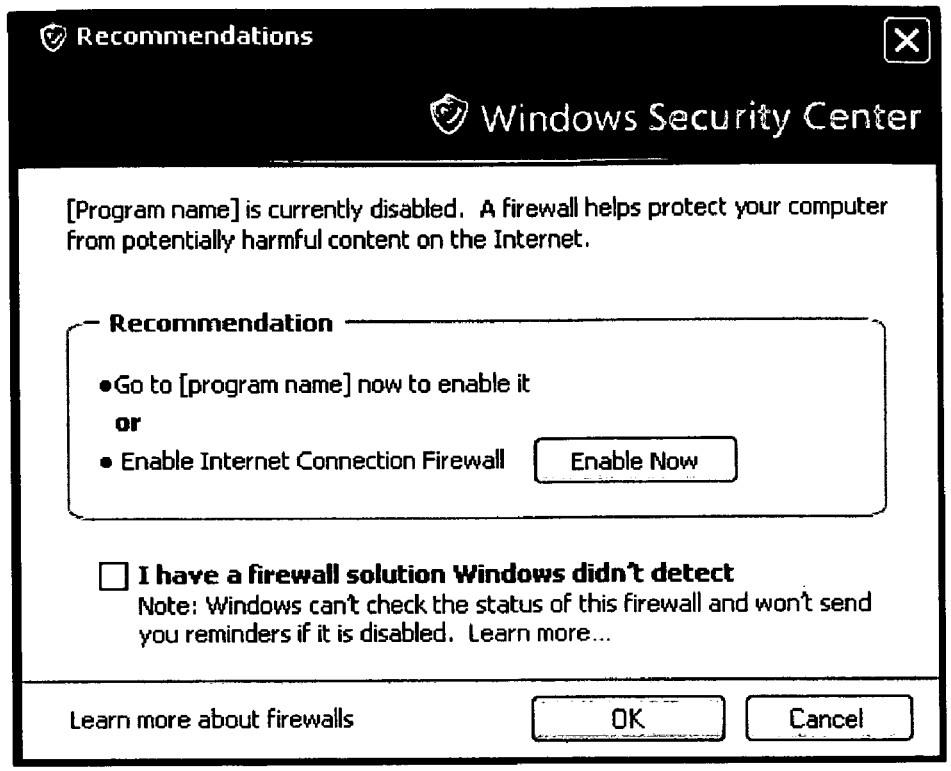

FIGS. 6B and 6C show other exemplary user interface screens that operate in accordance with various aspects of the invention. These screens provide other recommendations related to firewalls. It will be understood that other screens may be shown in response to selecting a recommendations button depending on the configuration of the computer and the firewall solutions detected without departing from the spirit or scope of the invention.

Figure 8:
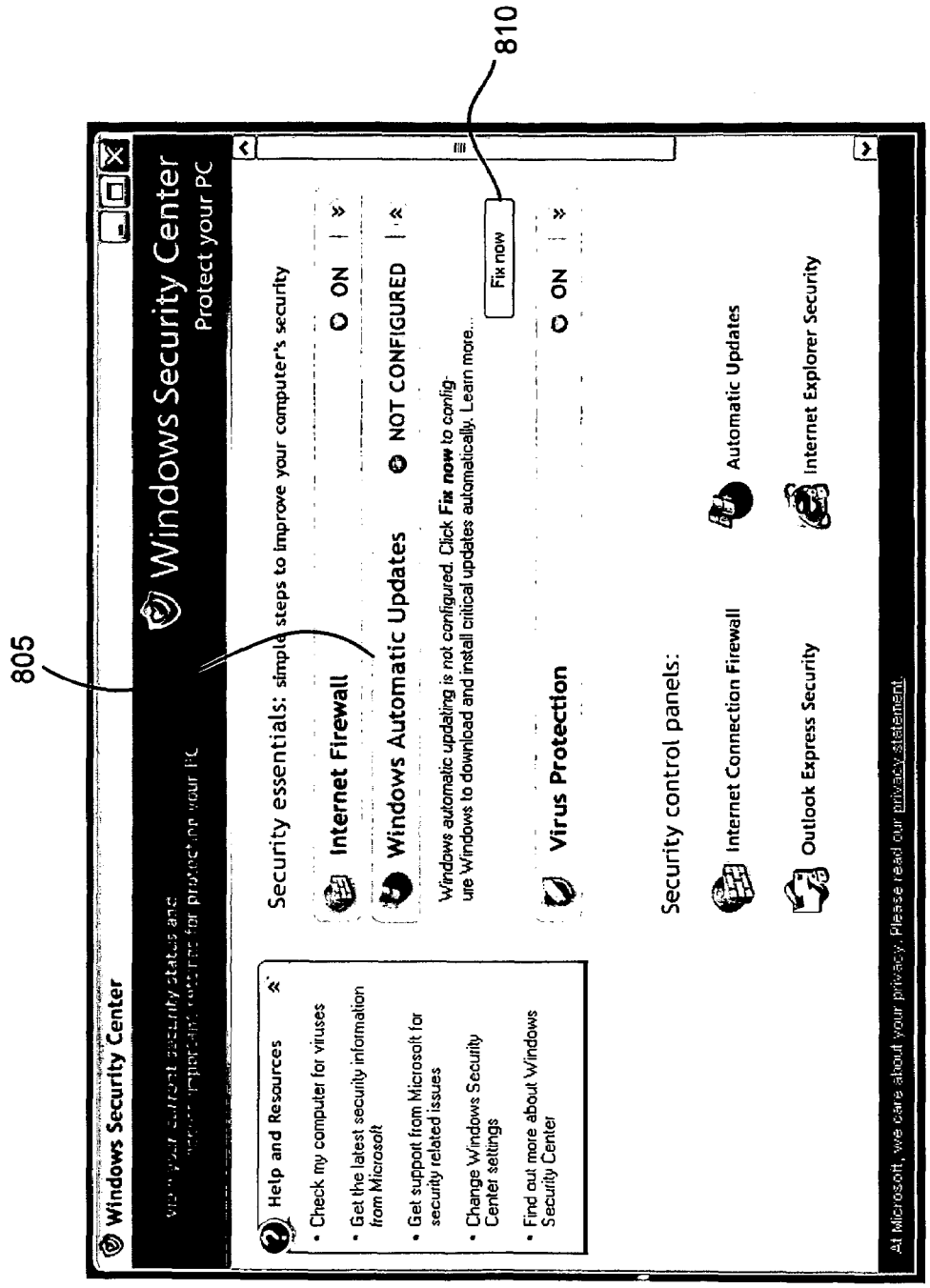
FIG. 8 shows a window including an exemplary user interface that operates in accordance with various aspects of the invention.

FIG. 8 shows a window including an exemplary user interface that operates in accordance with various aspects of the invention. As shown, the automatic updates item 805 has a yellow status and indicates that automatic updates are not configured. The automatic updates item 805 includes a fix button 810 that, when activated, causes automatic updating to be enabled in a preferred mode. When configured in this preferred mode, critical updates are automatically downloaded and installed. Critical updates typically include updates that fix identified security vulnerabilities in various system components. For example, critical updates may update an operating system, application, other component, and the like. The following table includes different automatic update settings and their associated engine light status and status icon states together with what action will occur, if any, if the fix button is activated.

In determining whether the computer has basic security in place, the security center may attempt to detect all known antivirus solutions on the computer, including Microsoft Internet Explorer®/Outlook® virus scanning feature as well as third party antivirus solutions. In addition, the security center may attempt to determine if detected antivirus solutions are enabled and up-to-date. The following table describes different detected conditions and their associated engine light states, statuses, and recommendations.

| $3^{rd}$ Party AV Solution Presence | $3^{rd}$ Party AV Solution Up-to-date | $3^{rd}$ Party AV Solution Executing in Real-Time | Engine Light | Status | Recommendation |
|---|---|---|---|---|---|
| Yes | Yes | Yes | Off | Green | None |
| Yes | Yes | No | On | Red | Enable real-time scanning in detected antivirus solution; Purchase and install another full antivirus program; or Check box indicating presence of undetected antivirus program. |
| Yes | Unknown | Unknown | On | Red | Make sure that the installed antivirus program is up-to-date and turned on; Purchase and install a full antivirus program; or Check box indicating presence of undetected antivirus program. |
| No | Unknown | Unknown | On | Red | Purchase and install a full antivirus program; or Check box indicating presence of undetected antivirus program. |
| Yes | No | Yes | On | Red | Update detected antivirus solution; Purchase and install another full antivirus program; or Check box indicating presence of undetected antivirus program. |

| AU Setting | Engine Light | Status | Fix Button |
|---|---|---|---|
| Auto download, auto install | Off | Green | None |
| Notify before download | Off | Yellow | Turn AU to auto-download, auto-install mode |
| Notify before install | Off | Yellow | Turn AU to auto-download, auto-install mode |
| Off | On | Red | Turn AU to auto-download, auto-install mode |
| Non-configured | Off | Yellow | Turn AU to auto-download, auto-install mode |

Figure 9:
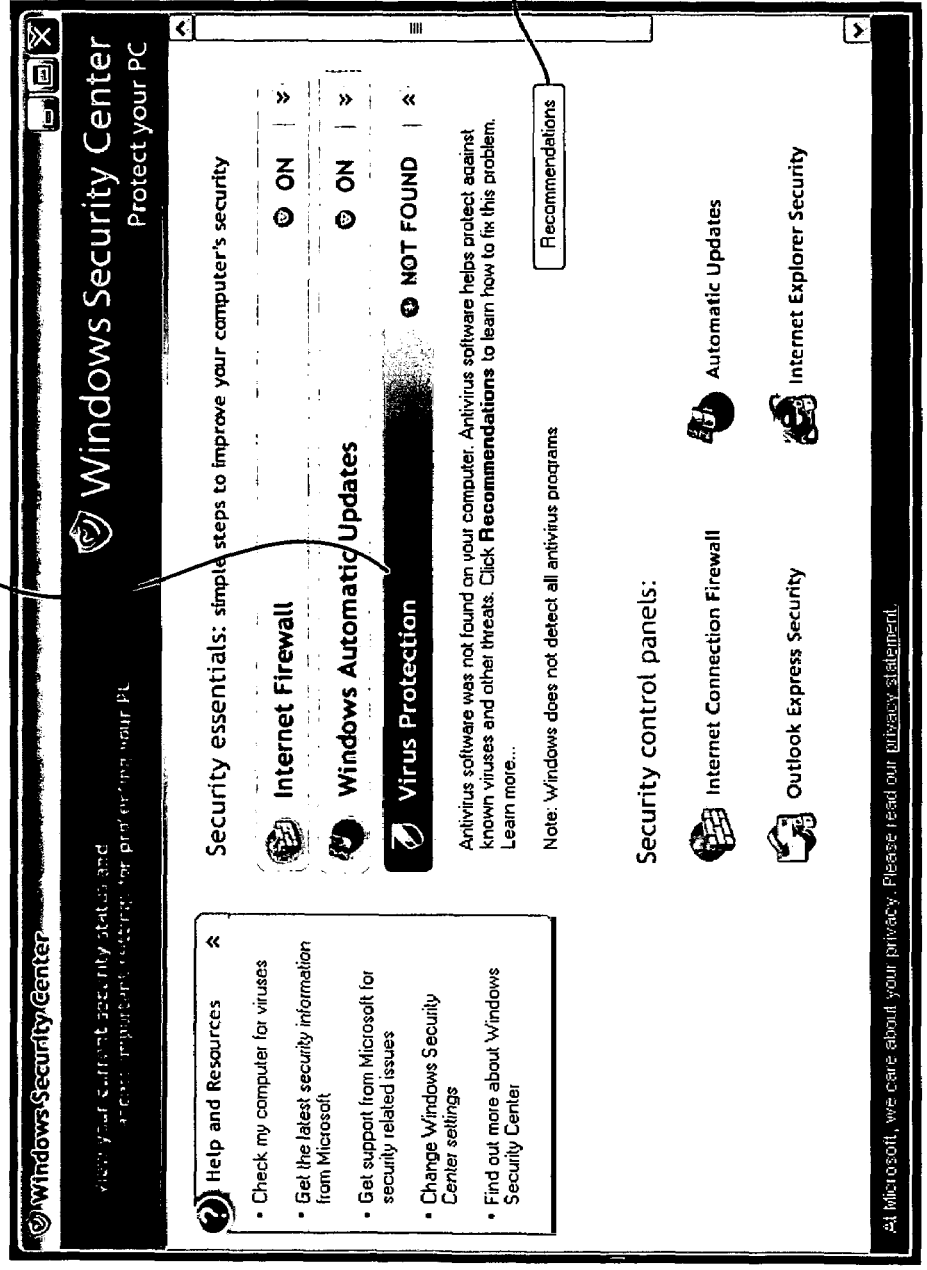
FIG. 9 shows a window including an exemplary user interface that operates in accordance with various aspects of the invention.

FIG. 9 shows a window including an exemplary user interface that operates in accordance with various aspects of the invention. As shown, the virus protection item 905 has a red status and indicates that virus protection software is not found. The virus protection item 905 includes a recommendations button 910 that, when activated, opens another window or the like that provides recommendations as to what steps the user may take to increase the security of the computer with respect to virus protection.

If multiple $3^{rd}$ party antivirus solutions are detected on the computer, a "Yes" in any cell means that at least one $3^{rd}$ party antivirus solution meets the requirement of the cell, while a "No" means that not a single $3^{rd}$ party antivirus solution meets the requirement of the cell.

Figure 10A:
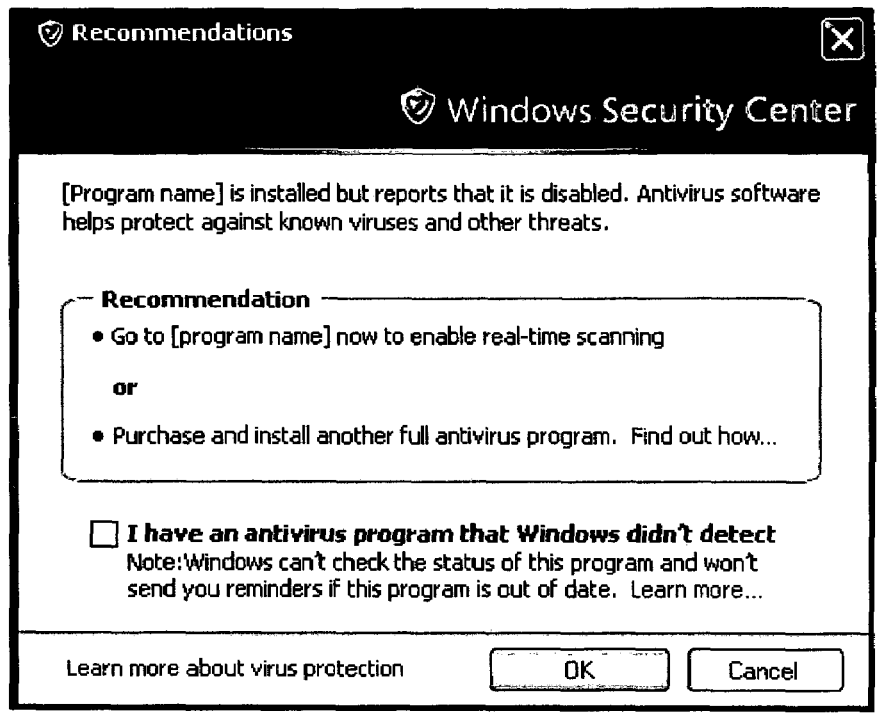
FIGS. 10A-10C show windows including exemplary user interface screens that operate in accordance with various aspects of the invention.
Figure 10B:
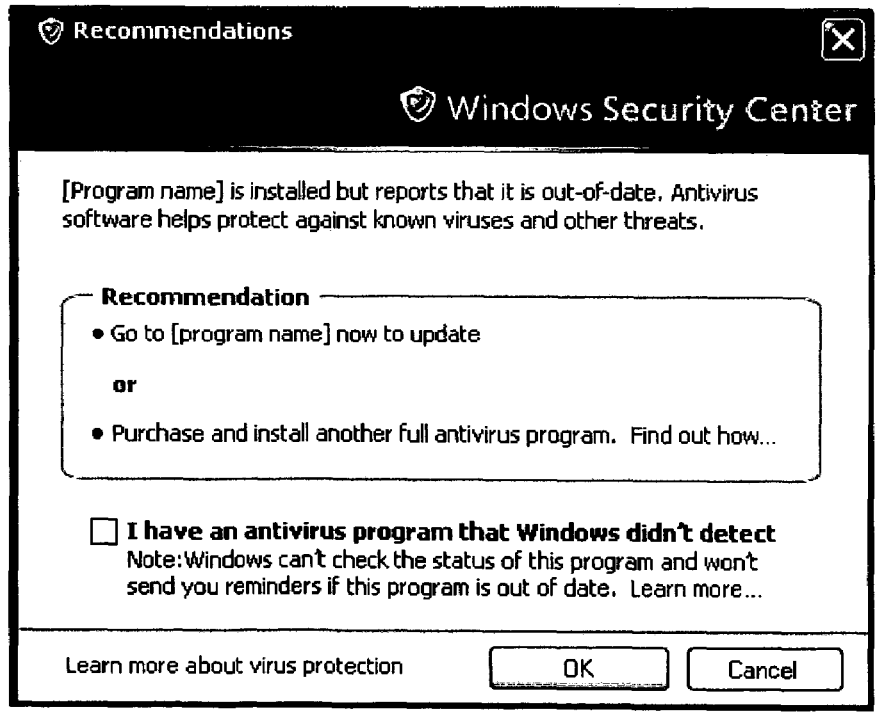
Figure 10C:
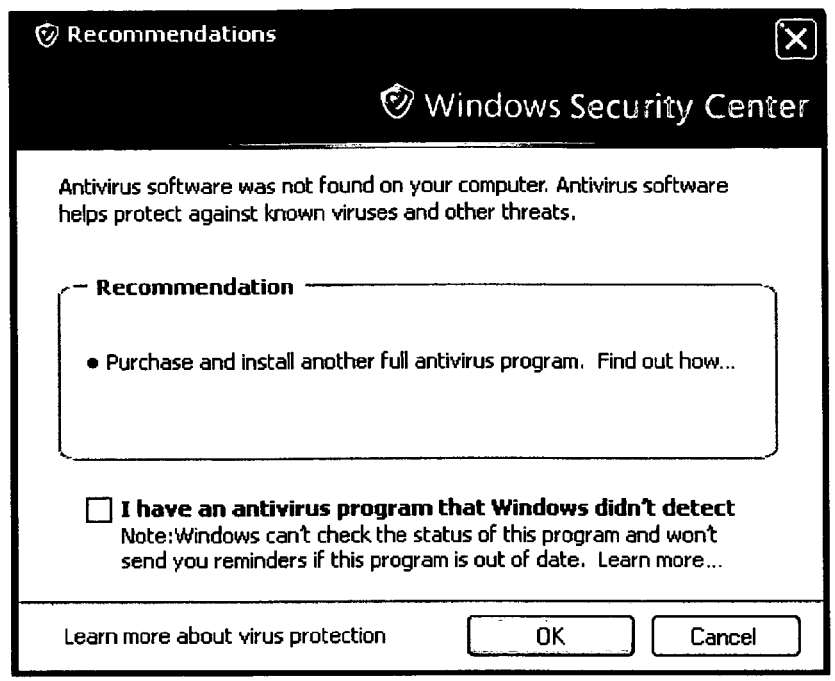
Figure 11:
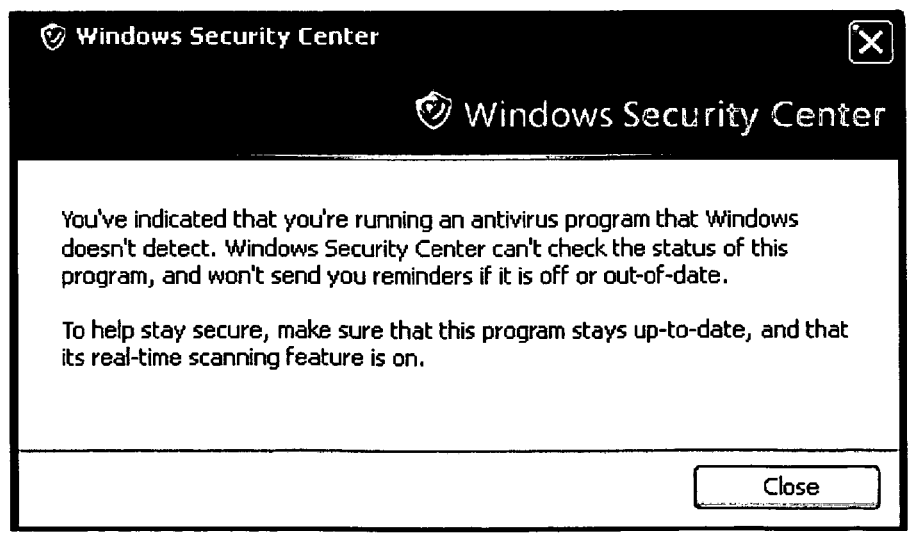
FIG. 11 shows a window including an exemplary dialog box that may be shown to inform a user of consequences of checking a box in accordance with various aspects of the invention.

FIGS. 10A-10C show windows including exemplary user interface screens that operate in accordance with various aspects of the invention. These screens provide recommendations with respect to antivirus protection and may be displayed when a recommendations button is activated. Each screen may include a check box that the user may select to indicate that the user has an antivirus program that is not detected. Checking this box may cause a dialog box similar to that shown in FIG. 11 to be displayed to inform the user of the consequences of checking the box. It will be understood that other screens may be shown in response to selecting a recommendations button depending on the configuration of the computer and the antivirus solutions detected without departing from the spirit or scope of the invention.

The security center may be implemented to detect a set of $3^{rd}$ party firewall and antivirus solutions (e.g., solutions from well-known providers). In some cases, the security center may detect the presence of a $3^{rd}$ party solution but not know the status of that solution. In these cases, the corresponding prescription item status may be set to red and the engine light turned ON. The user may then receive notification of a problem with a firewall or antivirus solution, as the case may be. Upon opening the security center, the item may be shown in red with text including the $3^{rd}$ party provider's name and stating that the solution was detected but the status of the solution is unknown. The user may then be directed to a recommendations dialog where the user may select a checkbox that essentially indicates that the user has a firewall or antivirus solution that the user will monitor. After the user selects this checkbox, the status may change to yellow and text may be displayed that indicates that the user has indicated that the user is running a firewall or antivirus solution that the user will personally monitor. Alternatively, the user may install or enable a firewall that the security center can monitor. After doing so, the status may change to green.

Figure 12:
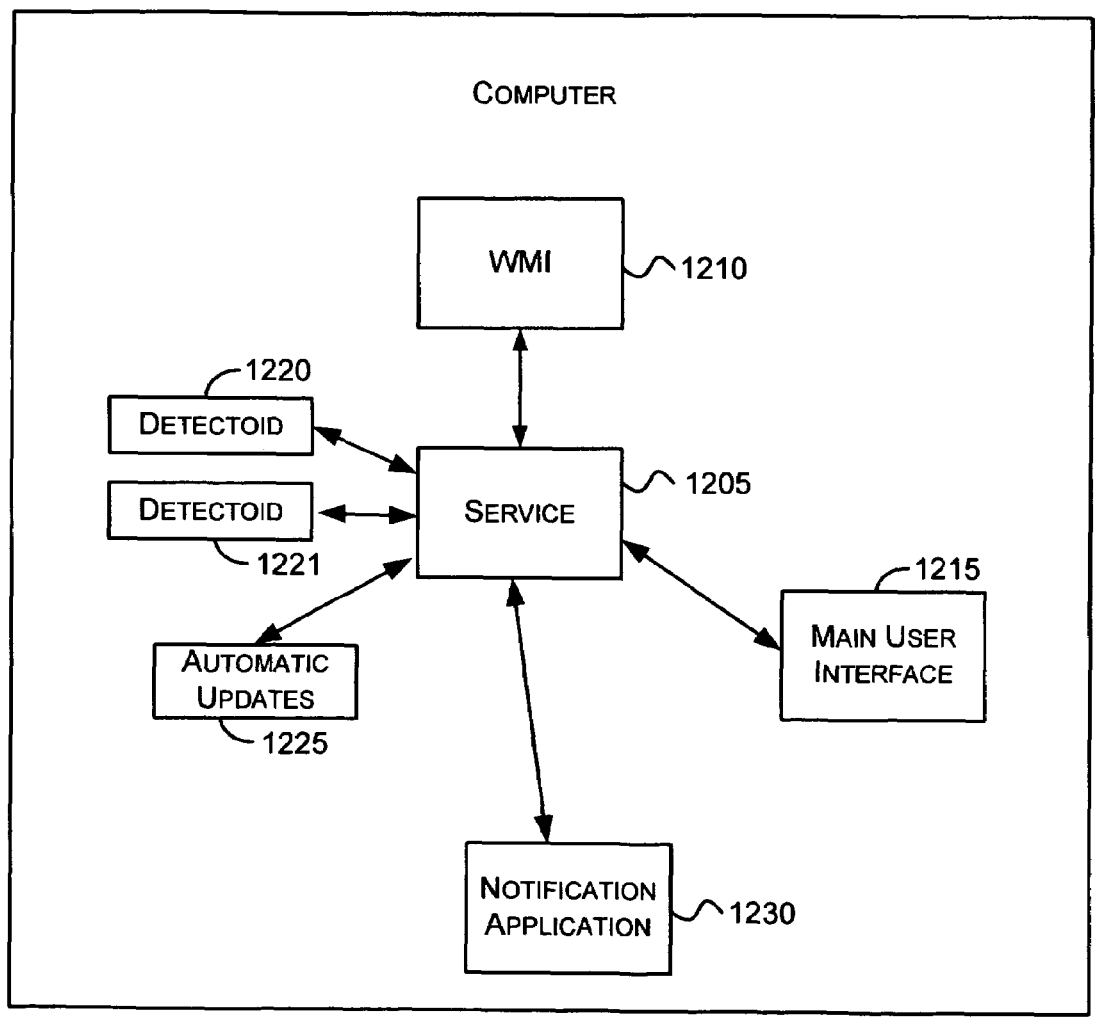
FIG. 12 is a block diagram that illustrates exemplary components that may be used to practice the invention in accordance with various aspects of the invention.

FIG. 12 is a block diagram that illustrates exemplary components that may be used to practice the invention in accordance with various aspects of the invention. The security center may include a service 1205 that executes on the computer. The service 1205 determines what security-related solutions are installed, present, executing, and up-to-date and stores information related thereto. The service 1205 may also determine the status of such components and determine what alerts need to be displayed on a main user interface 1215. The service 1205 communicates with Windows® Management Instrumentation (WMI) 1210, which is essentially a data repository. The WMI 1210 provides a store for storing and retrieving data in a structured manner. Applications, such as the service 1205, may register to be notified when particular data is inserted or modified in the WMI 1210. Security solutions may publish information to the WMI 1210 which will then notify the service 1205 of the information published. One purpose of the WMI 1210 is to provide an easy mechanism for third party products to indicate their status without requiring active detection by the service 1205. Another purpose of the WMI 1210 is to provide an easy mechanism for allowing third party security vendors to build solutions provide their status to the security system.

For security-related solutions, the WMI 1210 may have a schema that indicates the structure of information that security-related solutions may communicate to the WMI 1210. The schema may include such information as the name of the security-related solution, whether the solution is enabled, whether the solution is up-to-date, the path of an executable associated with the solution, the parameters that need to be passed to the executable to enable the solution, the parameters that need to be passed to the executable to launch a user interface associated with the solution, the parameters that need to be passed to the executable to update the executable's antivirus signatures (for an antivirus solution), and the like. FIG. 16 is a table that shows an exemplary schema in accordance with various aspects of the invention. The WMI 1210 may include a different schema for each type of security solution (e.g., firewalls, antivirus software, and the like). When a security-related solution's state changes, the solution may inform the WMI 1210 by filling out an object in accordance with the appropriate schema and providing the object to the WMI 1210. A solution's state may change, for example, when the solution is installed or uninstalled, enabled, disabled, executing, stopped, out-of-date, up-to-date, and the like. The WMI 1210 may then inform the service 1205 of the change.

To determine whether a security-related solution is installed correctly, executing, and/or up-to-date, the service 1205 may also examine various components and data stores. The service 1205 may utilize one or more detectoids 1220-1221 to detect data related to various solutions on the computer. A detectoid is an application written to detect data and state changes related to a particular security solution or solutions provided by a particular vendor. In general, a detectoid may be configured to monitor any security-related information stored on a computer and any security-related processes running on the computer. For example, a detectoid may examine registry entries, a service control manager, file system objects, and other data and processes to determine the status of the security solution or solutions it monitors. The set of detectoids may be fixed at compile time to avoid security vulnerabilities including the potential of adding additional detectoids (by a malicious program, for example) at run time. The set of detectoids present in the security center may be changed by providing a new version of the service 1205.

When a security-related solution is installed correctly, certain registry keys will typically be found in a registry. These registry keys may include data that indicates where files associated with the solution may be found. The absence of appropriate registry keys or the files associated with registry keys may indicate that a solution was not installed properly.

A service control manager (not shown) comprises a database that includes information regarding services installed on the computer. Many security-related solutions are installed as services. Detecting that a solution is operating correctly may include determining if a service has been registered for the solution, whether the service is enabled, and whether the service is currently executing. This data may be collected through the service control manager.

A detectoid may determine whether a solution is installed, what version of the solution is installed, what state the solution is in (e.g., whether the solution is enabled or not), whether the solution is up-to-date, and other information regarding the solution. The detectoid may monitor the solution in real-time and provide updates to the service 1205 as the solution's state changes.

In another embodiment, the detectoids 1220-1221 may update a respository associated with the WMI 1210 instead of directly reporting to the service 1205. This is described below in more detail in conjunction with FIG. 17.

The service 1205 may also utilize a special purpose automatic updates application 1225 to determine the state of automatic updates. The automatic updates application 1225 may communicate with operating system components or other components to determine the status and configuration of automatic updates.

The service 1205 may store the information it receives from the detectoids 1220-1221, from the WMI 1210, and otherwise in a local store. The service 1205 may also store information related to the configuration of the security center in a store such as a registry.

A user may interact with the security center through a main user interface 1215. The main user interface 1215 includes screens such as those shown in FIGS. 2-11. The main user interface 1215 may be thought of as a "window" into the information and configuration of the service 1205.

A notification application 1230 provides notifications through balloons, the system tray icon, and otherwise. If a balloon or the system tray icon is selected, the main user interface 1230 may be launched. The notification application 1230 may not execute when the engine light is off. The service 1205 launches the notification application 1230 to provide notification that the security of the computer needs attention.

The notification application 1230 and the main user interface 1215 both communicate with the service 1205. This communication may be done using any communication mechanism, medium, and protocol without departing from the spirit or scope of the invention.

Figure 13:
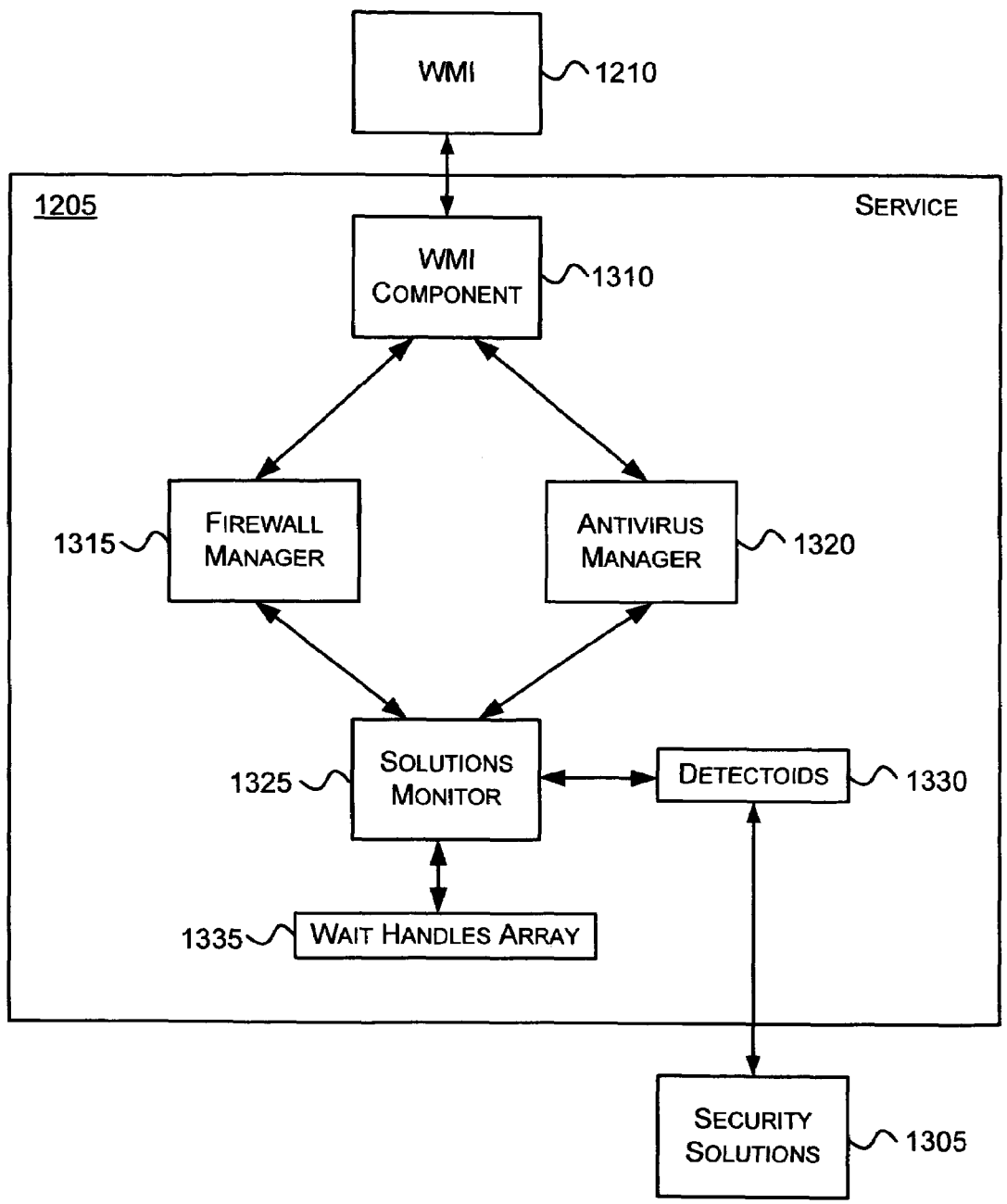
FIG. 13 is a block diagram that illustrates exemplary components that may be used to practice the invention in accordance with various aspects of the invention.

FIG. 13 is a block diagram that illustrates exemplary components that may be used to practice the invention in accordance with various aspects of the invention. When the service 1205 begins executing, a WMI component 1310 queries the WMI 1210. The WMI component 1310 asks for all information about security solutions that are currently installed. The WIM component 1310 then places this information (or information derived therefrom) into the firewall manager 1315 and the antivirus manager 1320 as appropriate. The WMI component 1310 also registers with the WMI 1210 to receive notification of all changes related to security solutions. Changes to security solutions include, for example, installing a new security solution, uninstalling a security solution, updating a security solution, and changing state of a security solution. In essence, anything that a security solution publishes to the WMI 1210 may be relayed to the WMI component 1310. The WMI component 1310 inserts these changes, as appropriate, into the firewall manager 1315 and the antivirus manager 1320.

In one embodiment of the invention, the firewall manager 1315 is implemented as a class that maintains information about firewall products. The firewall manager 1315 includes a list of external firewall structures. An external firewall structure may include data similar to the schema previously mentioned. For example, an external firewall structure may include the name of a firewall product or vendor, a presence-only flag, an enabled flag, a path to an executable program associated with the firewall product, and other data associated with the firewall product or vendor.

In one embodiment of the invention, the antivirus manager 1320 is implemented as a class that maintains information about antivirus solutions. The antivirus manager 1320 includes a list of external antivirus solution structures. An external antivirus solution structure may include data similar to the schema previously mentioned. For example, an external antivirus structure may include the name of an antivirus product or vendor, a presence-only flag, an enabled flag, a flag that indicates whether the antivirus product is up-to-date, a path to an executable program associated with the antivirus product, and other data associated with the antivirus product.

The data that is maintained in the firewall manager 1315 and the antivirus manager 1320 is used by the main user interface 1215 of FIG. 12.

A solutions monitor 1325 interacts with detectoids 1330 to detect changes in security solutions 1305. The solutions monitor 1325 may include a list of the detectoids 1330 that are available.

The detectoids 1330 includes detectoids that are used to monitor the security solutions 1305. A detectoid may detect various aspects regarding an associated security solution, including presence (i.e., is the product properly installed on the computer), the state of a security solution, and the like. In addition, a detectoid may obtain and destroy wait handles and fill in data structures regarding the state of an associated security solution. A wait handle is associated with a particular state of a security solution. A wait handle may be used wake a process when the associated state changes. A wait handle may be associated with one or more registry key, files, service control manager state changes, and the like.

The solution monitor 1325 obtains wait handles from the detectoids 1330 and places the wait handles into a wait handles array 1335. The solution monitor 1325 waits on the handles in the wait handles array 1335 and activates a detectoid when a wait handle wakes the solutions monitor 1325. After the activated detectoid obtains updated information about its associated security solution, the solutions monitor 1325 places this information into one of the managers.

Figure 14:
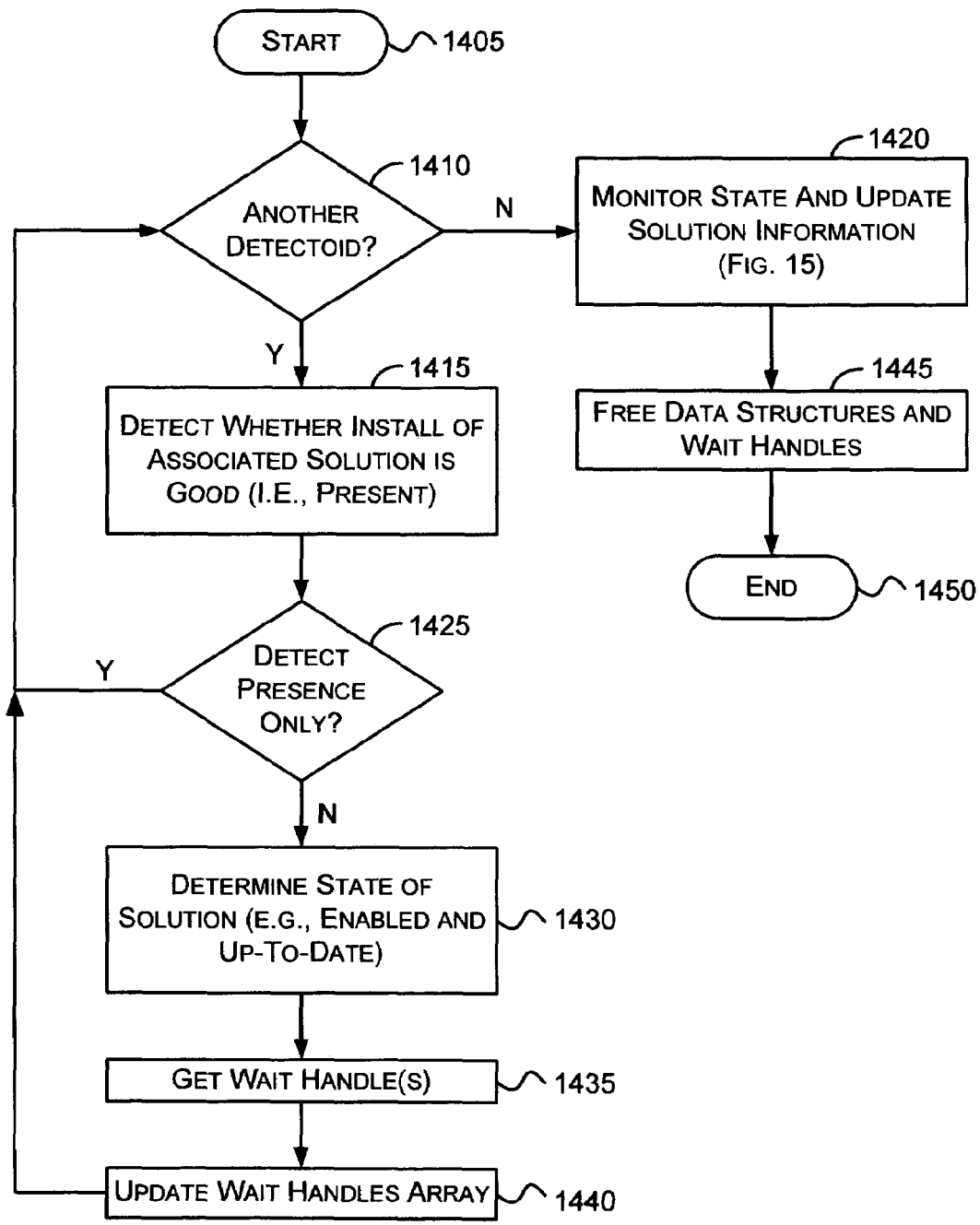
FIGS. 14 and 15 are dataflow diagrams that generally represent exemplary steps that may occur when detecting state changes in security solutions in accordance with various aspects of the invention.
Figure 15:
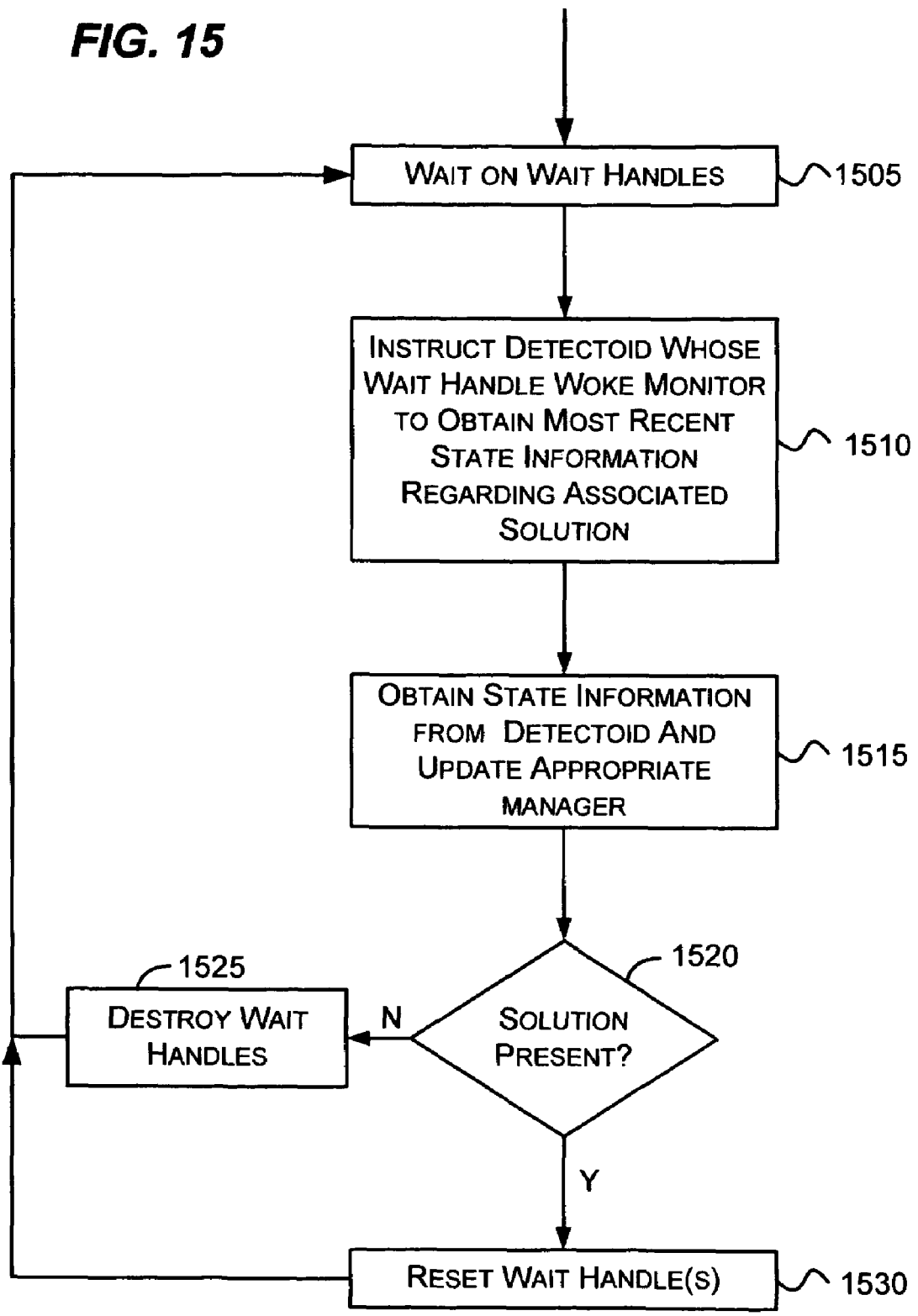

FIGS. 14 and 15 are dataflow diagrams that generally represent exemplary steps that may occur when detecting state changes in security solutions in accordance with various aspects of the invention. The process starts at block 1405. After block 1405, the process continues at block 1410. At block 1410, a determination is made as to whether another detectoid exists. If so, processing branches to block 1415; otherwise, processing branches to block 1420.

At block 1415, detecting whether the solution was correctly installed is performed. Detecting whether a solution is present may be done by checking registry values, a service control manager, and files as previously described.

At block 1425, a determination is made as to whether the presence only of the solution is detected. If so, processing branches to block 1410; otherwise, processing branches to block 1430.

At block 1430, the state of the solution (e.g., enabled, up-to-date, executing, and the like) is determined. For example, in the case of an antivirus solution, a state of enabled may indicate that real-time antivirus scanner is enabled within the antivirus solution.

At block 1435, wait handles are obtained. The number of wait handles obtained typically depends on the particular solution being monitored. At block 1440, a wait handles array (e.g., the wait handles array 1335 of FIG. 13) is updated to include the obtained wait handles. Processing then continues at block 1410. After all detectoids are processed, processing continues at block 1420. At block 1420, the state of the security solutions is monitored via the wait handles and information about the solutions is updated as the state changes, as described in more detail in conjunction with FIG. 15.

At block 1445, when the service is shut down, data structures and wait handles are freed. At block 1450, the process ends. The process described above or portions thereof may occur at any time including each time the service is started and when the main user interface 1215 is launched or requests re-execution of the process. Re-execution may be useful, for example, after a user has installed or updated a security solution.

When a computer is booting, the detection of security solutions may begin before the security solutions become fully operational. To account for this, the service may delay marking a solution as not working until the service has given the solution sufficient time to become operational. The time given may be predetermined or selected and may vary from solution to solution. In one embodiment, the service waits 60 seconds for the solution to become operational before indicating that the solution is not working.

Similarly, some solutions may stop executing for a period of time to update components and the like. The service may delay marking a solution as not working unless the solution stops executing for a predetermined or selected amount of time. The amount of time that a solution may stop executing before it is marked as non-operational may vary from solution to solution.

Referring to FIG. 15, at block 1505, the process may wait for an event by using the wait handles. Once an event triggers one of the wait handles, processing continues at block 1510. At block 1510, the detectoid whose wait handle woke the monitor is instructed to obtain state information regarding its associated security solution. At block 1515, after the state information is obtained by the detectoid, the state information in the appropriate manager is updated.

At block 1520 a determination is made as to whether the solution is still present (i.e., properly installed). A detectoid may detect that a security solution has been uninstalled. In this case, the appropriate manager may be updated to remove the entry for the security solution.

If the solution is still present, processing branches to block 1530 where the wait handles for the solution are reset. If not, processing branches to block 1525 where the wait handles for the solution are destroyed. After block 1525 or block 1530, processing continues at block 1505. The process described above continues until the service is shut down.

Figure 17:
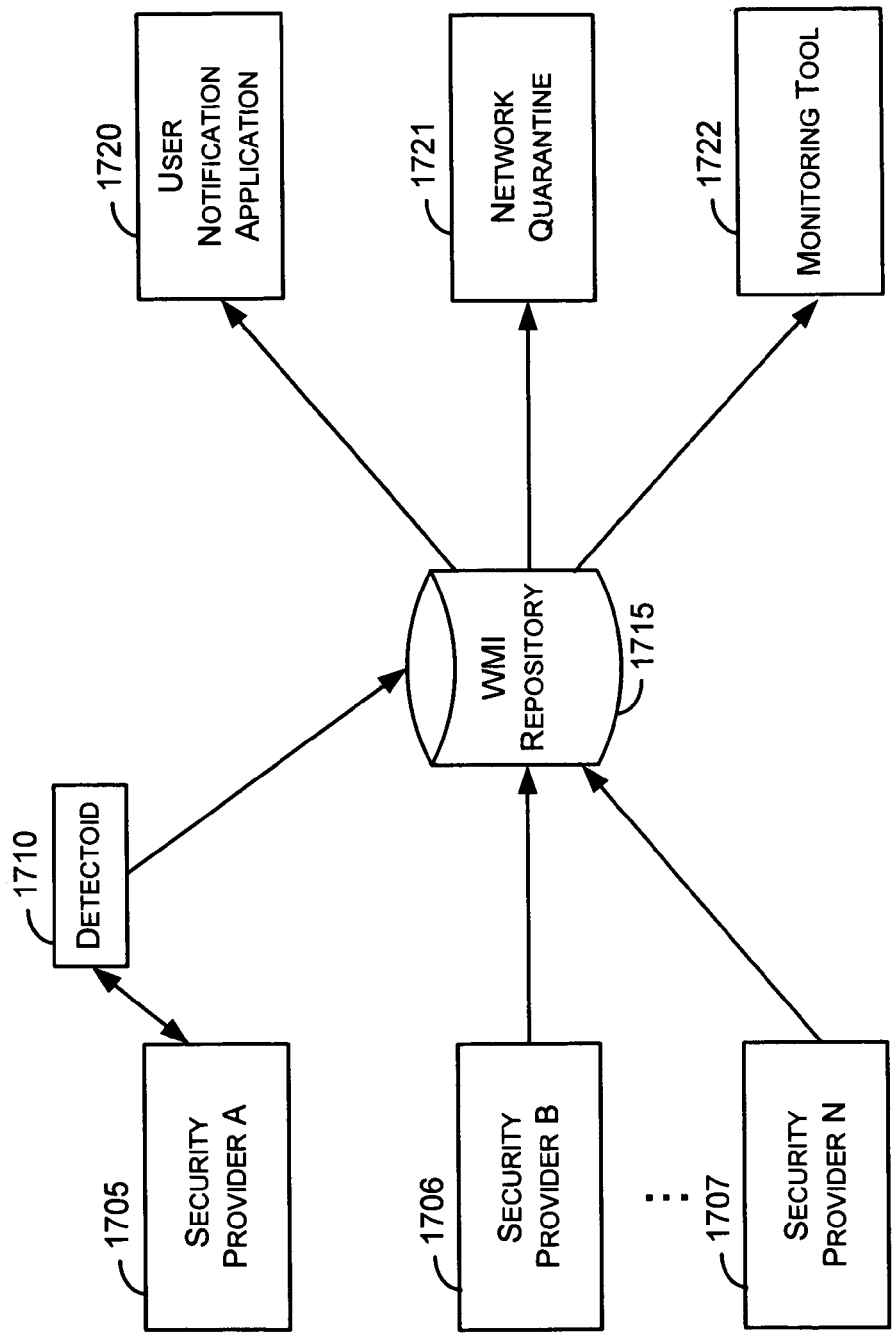
FIG. 17 is a block diagram that generally represents another exemplary arrangement of components that may be used to practice the invention in accordance with various aspects of the invention.

FIG. 17 is a block diagram that generally represents another exemplary arrangement of components that may be used to practice the invention in accordance with various aspects of the invention. The components may include security providers 1705-1707, a detectoid 1710, a repository 1715, and consumer applications 1720-1722 (sometimes referred to as "consumers"). The consumer applications 1720-1722 may include, for example, a user notification application 1720, a network quarantine application 1721, and a monitoring tool 1722.

The repository 1715 may store information according to a schema. An exemplary repository that may be used for the respository 1715 is the data repository of WMI as has been discussed previously. The repository 1715 may perform any of the actions described in conjunction with the WMI 1210 of FIG. 12. Other exemplary repositories that may be used for the repository 1715 include a registry, a file, a database, and the like. It will be recognized, however, that many types of storage and data structures may be used for the repository 1715 without departing from the spirit or scope of the present invention.

For each type of security threat, the schema may define various fields that security providers may populate and update with data and that consumer applications may read. Some or all of the fields associated with a particular security threat may define a baseline that indicates whether the security provider is adequately protecting against a particular security threat. For example, referring to FIG. 16, for an antivirus product, the schema may define a field that indicates whether on-access scanning is enabled and a field that indicates whether the antivirus product is up-to-date (e.g., includes the most recent signatures). When the antivirus product has on-access scanning enabled and is up-to-date, the antivirus product may be deemed to be adequately protecting the computer against virus threats.

The ability to write to the repository 1715 may be tied to a user privilege of the computer upon which the repository 1715 resides. For example, in one embodiment, the repository 1715 may only be written to by an application or system component having administrator privileges or higher.

Other measures may also be taken to increase the security of the repository 1715 against modifications by a non-trusted entity. For example, a non-trusted entity such as a virus may obtain administrator privileges on a computer. The virus may then modify data in the repository to falsely indicate that the computer is protected.

To protect against this threat, the schema may include an additional field that points to a binary installed by the security provider. The binary may be signed by a key that allows certification that the binary is a trusted security product. When the contents of the repository are read, certificate signature validation may be performed on the binary to determine if the product is a trusted security product. In addition, the certificates may expire on a rolling expire pattern (e.g., expire after 3-6 months) so that security provider companies keep their products up-to-date and obtain recent certificates. This protection makes it harder for malicious attackers to use old binaries and distribute them with their malware in an attempt to spoof consumers of the data of the repository 1715.

In another embodiment, driver signing techniques used for signing hardware drivers may be used to increase the security of the repository 1715 against modifications by a non-trusted entity. Such techniques add additional property capabilities bits to a signed catalog and identify certain drivers on the machine by security provider type (e.g., antivirus, firewall, and the like). The repository 1715 may include data which indicates to which driver each entry is related. Using this information, the driver manager may be queried to look at the capabilities bits of the driver and to validate the product.

It will be recognized that other techniques may also be used to increase the security of the repository 1715 against modifications by a non-trusted entity without departing from the spirit or scope of the present invention.

As reading from the repository 1715 does not typically compromise the security of the repository 1715, in some embodiments, any application executing on the computer upon which the repository 1715 resides may read data from the repository 1715.

A security provider may have more information than is allowed in the fields defined by the schema. Such information is not typically maintained in the repository 1715 (unless the schema changes), but may be maintained by the security provider without departing from the spirit and scope of the invention.

The set of fields defined for one type of security threat may be (and most often is) different from the set of fields defined for another type of security threat. For example, an antivirus provider may update a field that indicates that the antivirus provider is scanning on access while a firewall provider may have no need for such a field. FIG. 19 includes an exemplary schema that defines fields for antivirus and firewall products according to various aspects of the invention.

It will be recognized that the schema may be extended to deal with various computer-related issues in which providers attempt to deal with the issues and in which consumer applications obtain information about the status of the providers. For example, the schema may be extended to define baseline protection for operating system updates (e.g., Windows® updates), adware, spyware, spam, phishing, and the like, by adding another class and defining fields that providers may populate and update and that consumers may read. The updated schema may then be propagated to computers of interest (e.g., through an operating system update mechanism) and installed thereon.

Alternatively, a security provider, consumer application, or other application may change the schema for a computer and begin reporting or obtaining information related to the new data reflected in the schema. Note that having additional information in a schema may not affect already-existing consumers or security providers as the already-existing consumers and security providers simply request and change data in fields that they were already aware of (e.g., in fields that were not added).

A consumer application that reads from the repository 1715 may include any computer application that is configured to obtain data from the repository. One such application (i.e., user notification application 1720 ) may provide the user with a notification when the security protection of the computer has changed as indicated by data in the repository 1715. An example of a user notification application 1720 is the service 1205 described in conjunction with FIGS. 12 and 13.

A network quarantine application 1721 is another application that may read from the repository 1715. A network quarantine application 1721 may be utilized to restrict the network access granted to a computer. For example, a computer may not have antivirus software installed. To reduce the risk of spreading a virus to other computers on a network, the computer may be given reduced access to network resources and informed that antivirus software must be installed, maintained up-to-date, and executed in order to gain broader access. If the virus signatures of antivirus software executing on a computer are out-of-date, the computer may be given reduced access until the signatures are updated to the most recent version. The network quarantine application 1721 may execute on the same machine that the repository 1715 resides, may execute on a separate machine (e.g., a server), or may have components that execute on both the same machine upon which the repository 1715 executes and another machine. The network quarantine application 1721 may collect information from the repository 1715 and use this information to grant, reduce, or deny network access to the machine upon which the repository 1715 resides.

A monitoring tool 1722 is an application that monitors the repository 1715 and that may perform actions based on data contained or modified therein.

As mentioned previously, a consumer application may register with the repository 1715 to be notified when particular data within the repository 1715 is inserted or modified. Also, for security providers that are not configured to update the repository 1715 (e.g., the security provider 1705), as mentioned previously, a detectoid (e.g., detectoid 1710) may be created to monitor the security provider and to update the repository 1715 as the state of the security provider changes.

More than one security provider may address one security threat. For example, there may be more than one antivirus security provider or more than one firewall security provider executing on a machine. Each security provider may update its corresponding object (e.g., an object assigned to the security provider) in the repository 1715 each time the state of the security provider changes.

Security providers may write to objects in the repository 1715, even if no consumer application is currently configured to read from those objects. Likewise, a consumer application may be configured to read from an object in the repository, even if no security provider is configured to write to that object. This is in part due to the extensible nature of aspects of the invention described herein.

FIG. 18 is a dataflow diagram that generally represents exemplary actions that may occur in relation to a repository in accordance with various aspects of the invention. At block 1805, the process begins.

At block 1810, a baseline level of protection is defined. Essentially, a determination of those attributes needed to ensure that a security provider is performing its job adequately is made. Each threat may have its own unique set of attributes. At block 1815, a schema is created based on the baseline.

After block 1815, waiting may occur until actions associated with one of the blocks 1820-1830 are performed. At block 1820, information in a repository is updated. For example, a security provider may change states and may indicate its changed state in the repository.

At block 1825, information is obtained from the repository. For example, a consumer may request information regarding antivirus providers from the repository.

At block 1830, a notification is provided when data in the repository changes. For example, if a security provider changes information in the repository and a consumer has requested to be notified when the information changes, the consumer is notified.

The actions associated with blocks 1820-1830 may be repeated until the computer including the repository is shut down or re-boot or until the process interacting with the repository is terminated.

As can be seen from the foregoing detailed description, there is provided a framework and associated methods for monitoring, reporting, and notifying with respect to security protection levels. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions which when executed perform steps comprising:

on a computer system, determining a baseline level of protection for each of a plurality of types of security applications;

generating a schema for each of the baseline levels, wherein each schema is used by corresponding types of security applications to update fields of data stored in a repository, the fields of data representing the protection that a security application that runs on the computer system and that corresponds to the specific schema must provide;

receiving, from a first security application that corresponds to a first schema, first data that is formatted according to the first schema;

upon receiving the first data, updating at least one field of data stored in the repository with the received data, the at least one field of data corresponding to the first security application;

after the at least one field of data is updated, a consumer application reading the at least one field of data, and detecting that the at least one field of data has been updated;

in response to detecting that the at least one field of data has been updated, the consumer application displaying a notification that the protection level provided by the first security application has changed; and wherein the computer system further includes a detectoid running on the system to detect changes to the protection level provided by security applications that are not configured to communicate data to the repository, and wherein the steps further comprise:

a detectoid detecting that a second security application has changed its protection level, wherein the second security application is not configured to communicate data to the repository;

the detectoid obtaining data corresponding to the changed protection level of the second security application;

the detectoid providing the data to the repository to update at least one field of data corresponding to the second security application; and the consumer application detecting that the at least one field of data corresponding to the second security application has been undated, and in response, displaying a notification that the protection level provided by the second security application has changed.

2. The computer-readable storage medium of claim 1 wherein the detectoid is an application that detects data and state changes related to a particular security application.

3. The computer-readable storage medium of claim 1 wherein the detectoid detects that the second security application has changed its protection level by accessing registry entries, a service control manager, or file system objects that are associated with the second security application.

4. The computer-readable storage medium of claim 1 wherein the detectoid is included within a service and wherein providing the data to the repository to update at least one field of data corresponding to the second security application comprises:
the detectoid providing the data to a solutions monitor of the service and the solutions monitor providing the data to the repository.

5. The computer-readable storage medium of claim 4 wherein the service includes an antivirus manager and a firewall manager, the steps further comprising:
upon the service being executed, a repository service of the service requesting data from the repository;
upon the repository service receiving the data, providing portions of the data to the antivirus manager and the firewall manager such that the antivirus manager and the firewall manager each receive portions of the data the correspond to each manager respectively.

6. The computer-readable storage medium of claim 1 wherein only components having a specified security level or higher have permission to cause one of the fields of data to be modified.

7. The computer-readable storage medium of claim 6 wherein the schema further includes a field that corresponds to a binary that is installed by the first security application, wherein the binary is signed by a key such that upon receiving first data from the first security application, the binary is read and validated to determine that the first security application is approved to modify the fields of data stored in the repository.

8. A method for providing a notification when the protection level of a security application changes, the method comprising:
on a computer system, determining a baseline level of protection for each of a plurality of types of security applications;
generating a schema for each of the baseline levels, wherein each schema is used by corresponding types of security applications to update fields of data stored in a repository, the fields of data representing the protection that a security application that runs on the computer system and that corresponds to the specific schema must provide;
receiving, from a first security application that corresponds to a first schema, first data that is formatted according to the first schema;
upon receiving the first data, updating at least one field of data stored in the repository with the received data, the at least one field of data corresponding to the first security application;
after the at least one field of data is updated, a consumer application reading the at least one field of data, and detecting that the at least one field of data has been updated;
in response to detecting that the at least one field of data has been updated, the consumer application displaying a notification that the protection level provided by the first security application has changed; and
wherein the computer system further includes a detectoid running on the system to detect changes to the protection level provided by security applications that are not configured to communicate data to the repository, and wherein the steps further comprise:

a detectoid detecting that a second security application has changed its protection level, wherein the second security application is not configured to communicate data to the repository;
the detectoid obtaining data corresponding to the changed protection level of the second security application;
the detectoid providing the data to the repository to update at least one field of data corresponding to the second security application; and
the consumer application detecting that the at least one field of data corresponding to the second security application has been undated,
and in response, displaying a notification that the protection level provided by the second security application has changed.

9. The method of claim 8 wherein the detectoid is an application that detects data and state changes related to a particular security application.

10. The method of claim 8 wherein the detectoid detects that the second security application has changed its protection level by accessing registry entries, a service control manager, or file system objects that are associated with the second security application.

11. The method of claim 8 wherein the detectoid is included within a service and wherein providing the data to the repository to update at least one field of data corresponding to the second security application comprises:
the detectoid providing the data to a solutions monitor of the service and the solutions monitor providing the data to the repository.

12. The method of claim 11 wherein the service includes an antivirus manager and a firewall manager, the method further comprising:
upon the service being executed, a repository service of the service requesting data from the repository;
upon the repository service receiving the data, providing portions of the data to the antivirus manager and the firewall manager such that the antivirus manager and the firewall manager each receive portions of the data the correspond to each manager respectively.

13. The method of claim 8 wherein only components having a specified security level or higher have permission to cause one of the fields of data to be modified.

14. The method of claim 13 wherein the schema further includes a field that corresponds to a binary that is installed by the first security application, wherein the binary is signed by a key such that upon receiving first data from the first security application, the binary is read and validated to determine that the first security application is approved to modify the fields of data stored in the repository.

15. A computer system comprising:
a processor; and
memory storing computer-executable instructions which when executed by the processor perform a method for providing a notification when the protection level of a security application changes, the method comprising:
on the computer system, determining a baseline level of protection for each of a plurality of types of security applications;
generating a schema for each of the baseline levels, wherein each schema is used by corresponding types of security applications to update fields of data stored in a repository, the fields of data representing the protection that a security application that runs on the computer system and that corresponds to the specific schema must provide; receiving, from a first security application that corresponds to a first schema, first data that is formatted according to the first schema;

upon receiving the first data, updating at least one field of data stored in the repository with the received data, the at least one field of data corresponding to the first security application;

after the at least one field of data is updated, a consumer application reading the at least one field of data, and detecting that the at least one field of data has been updated; and in response to detecting that the at least one field of data has been updated, the consumer application displaying a notification that the protection level provided by the first security application has changed; and wherein the computer system further includes a detectoid running on the system to detect changes to the protection level provided by security applications that are not configured to communicate data to the repository, and wherein the method further comprises:

a detectoid detecting that a second security application has changed its protection level, wherein the second security application is not configured to communicate data to the repository;

the detectoid obtaining data corresponding to the changed protection level of the second security application;

the detectoid providing the data to the repository to update at least one field of data corresponding to the second security application; and the consumer application detecting that the at least one field of data corresponding to the second security application has been updated, and in response, displaying a notification that the protection level provided by the second security application has changed.

16. The computer system of claim 15 wherein the detectoid is an application that detects data and state changes related to a particular security application.

17. The computer system of claim 15 wherein the detectoid detects that the second security application has changed its protection level by accessing registry entries, a service control manager, or file system objects that are associated with the second security application.

* * * * *